United States Patent [19]

Baker

[11] 4,091,825
[45] May 30, 1978

[54] RECOVERY OF UNOXIDIZED METALS FROM ORGANIC INSULATED METALLIC SCRAP

[75] Inventor: Albert B. Baker, Cottage Hills, Ill.

[73] Assignee: International Recycling Enterprises, Ltd., Godfrey, Ill.

[21] Appl. No.: 690,503

[22] Filed: May 27, 1976

[51] Int. Cl.² .............................................. B01D 5/00
[52] U.S. Cl. ......................................... 134/2; 29/403; 75/44 S; 134/10; 134/19; 209/11; 266/205; 432/72
[58] Field of Search ...................... 134/2, 10, 19, 25 R, 134/38; 29/403; 203/42; 209/11; 266/205; 75/44 S; 432/72

[56] References Cited

U.S. PATENT DOCUMENTS

| | | | |
|---|---|---|---|
| 1,869,844 | 8/1932 | Derr | 134/2 |
| 2,704,707 | 3/1955 | Lemeshka | 29/403 |
| 3,034,774 | 5/1962 | Broomhead et al. | 134/2 |
| 3,448,509 | 6/1969 | O'Reilly | 134/2 |
| 3,650,830 | 3/1972 | Mathis | 134/25 R |
| 3,749,322 | 7/1973 | Reynolds | 29/403 |

Primary Examiner—Robert L. Lindsay, Jr.
Assistant Examiner—George C. Yeung
Attorney, Agent, or Firm—Schuyler, Birch, Swindler, McKie and Beckett

[57] ABSTRACT

Metallic scrap containing a coating of organic insulation material is processed to recover a clean, unoxidized metallic substrate and various insulation by-products by thermally decomposing the organic insulation under pressure in a closed, externally heated vessel. Volatile decomposition products are periodically vented to a vapor recovery system and non-volatile decomposition products, primarily carbonaceous char adhering to the clean scrap, are separated by mechanical action such as vibration or tumbling. Apparatus for performing this process is also disclosed.

25 Claims, 1 Drawing Figure

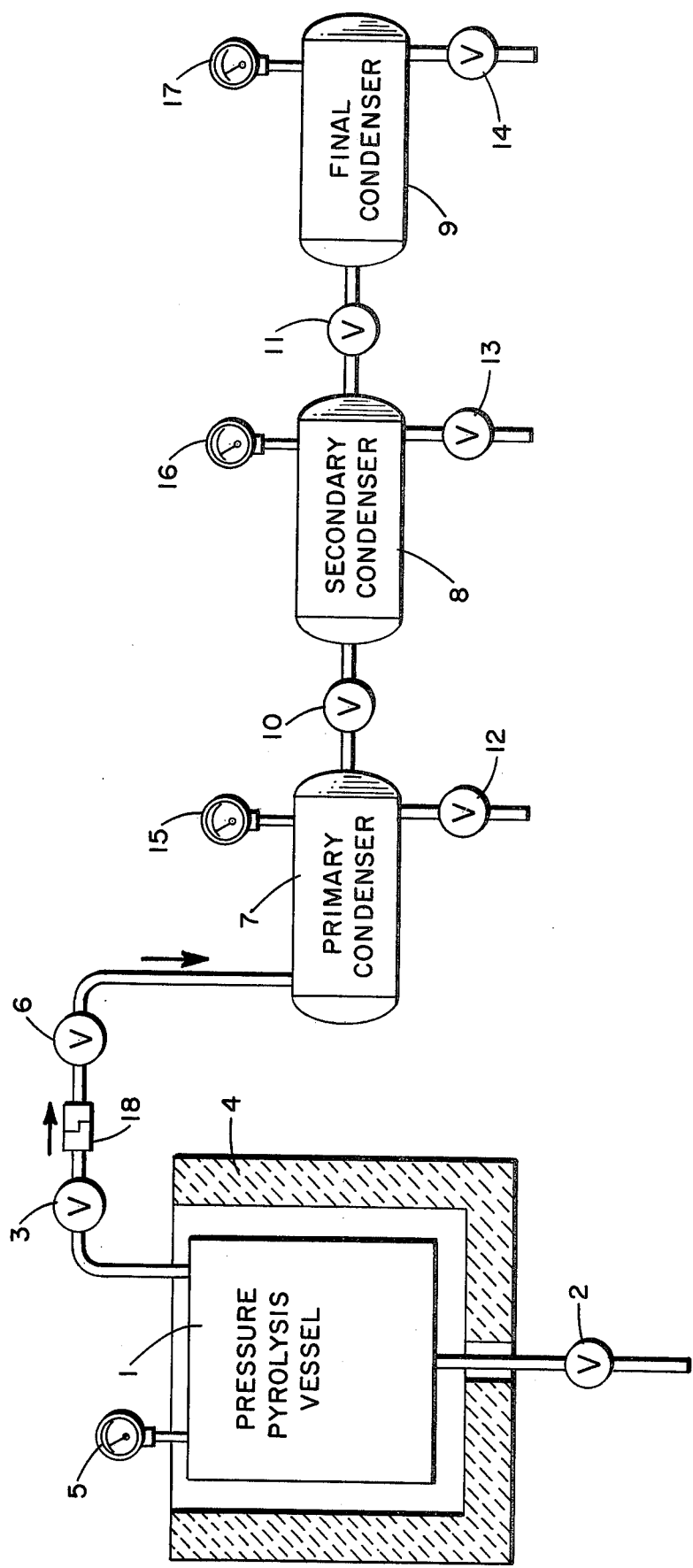

RECOVERY OF UNOXIDIZED METALS FROM ORGANIC INSULATED METALLIC SCRAP

BACKGROUND OF THE INVENTION

1. Field of the Invention

This invention relates to thermolytic distillation of the organic insulation material from metallic scrap to recover clean unoxidized metal and insulation by-products.

2. Description of the Prior Art

The history of the prior art in this area is aptly summarized in Urssing U.S. Pat. No. 3,877,474. Insulated electrical scrap such as wire, cable, magnetic coils, transformers and the like are utilized in large volumes in the electronics, electrical, communications, aerospace, and building industries, to name only a few. These materials typically comprise an inner metallic conductor encased within an outer sheath of insulating material. Multi-conductor cable, shielded wire and coaxial cable are commonly used variations which also contain metallic conductors and, in the case of shielded wire, metallic shielding. Copper is most frequently used as the inner conductor of wire and cable because of its excellent electrical conductive properties. However, other metals are also used such as, for example, aluminum. Typical insulating materials include paper, rubber, neoprene, polyvinyl chloride, polyurethane, polyethylene and Teflon.

Millions of pounds of scrap are produced annually in the United States and in other industrial nations from a number of sources. Firstly, as in most manufacturing processes, the fabrication of insulated wire and cable results in a certain amount of rejected scrap material. In addition, scrap is generated by the users of insulated wire and cable as a result of their fabrication processes, the scrapping of obsolete electrical and electronic equipment, replacement of power and telephone lines, the wrecking of buildings, and the rewiring of electrical and electronic systems and equipment. Generally, scrap insulated wire and cable is found in the form of masses of loose strands of varying lengths tangled into large coils or bales. The existence of tons of metal, such as copper, in this form has stimulated efforts to reclaim it economically.

In the prior art, a number of methods are known for the reclamation of metal from insulated scrap. One method of the prior art for reclaiming the metal conductors from scrap wire and cable is to remove the insulation manually by cutting and stripping means. Since this method requires each conductor wire to be treated individually, it is relatively slow and costly even on loose wire or cable. When the wire and cable is in the form of tangled coils or bales, the manual stripping method is prohibitive since the scrap would first have to be separated into individual strands prior to processing. In addition to being laborous and costly, this method is most suitable only with respect to wire and cable having larger diameters, such as AWG or MCM sized greater than 8.

Another method known in the prior art is to chemically dissolve the insulating material. This method has proved to be relatively uneconomical due to the typically high solids ratio of insulation to inner conductor by weight. For example, the insulation covering a copper inner conductor is typically 28 – 30 percent by weight of the wire. Because of the relatively high solids ratio, the cost of the chemical composition required to dissolve sufficient insulation to yield a pound of metal is too high with reference to the market value of the pound of metal yielded. An additional shortcoming of this method results from the fact that many different insulating materials are used in wires and cables. This fact requires the reclaimant to have various chemical compositions available, each one particularly suited to dissolving a particular type of insulating material.

Another common method of the prior art involves combustion of the insulating material to enable the recovery of the metal conductor within the wire or cable. This method has serious practical limitations. In the first place, the metal recovered is charred, i.e., oxidized due to the high temperature required to burn off the insulating material. In the case of copper conductors, combustion results in the loss of approximately 6 percent by weight of the copper which was potentially recoverable. Secondly, the oxidized metal is of a lower grade than unoxidized metal and therefore yields less on the market. An additional and very substantial shortcoming of the combustion method is that, without special purpose air pollution abatement equipment, it results in the emission of air pollutants into the air. Lastly, the burning method destroys the insulation and therefore whatever value the insulating material might have is lost.

In order to avoid the oxidation problems associated with the burning methods, the prior art has recently turned to heating in a non-oxidizing atmosphere. See, for example, Swartz, U.S. Pat. No. 3,821,026 and Deitz, U.S. Pat. No. 3,225,428. In another prior art process insulation decomposition is effected without wire oxidation by externally heating a reaction vessel which is sealed against the inflow of air, see O'Reilly, U.S. Pat. No. 3,448,509.

SUMMARY OF THE INVENTION

It is an object of the present invention to provide a process for the efficient and economic separation and recovery of the components of insulated metallic scrap.

It is also an object of this invention to provide a process which results in clean, unoxidized scrap metal recovery.

It is a further object of this invention to provide an insulated metallic scrap recovery process which does not emit any effluents to the atmosphere.

Another object of the present invention is to provide an insulated metallic scrap recovery process which can be effected in a relatively short period of time.

Briefly described, the present invention is directed to a method for removing organic insulation from insulated metallic scrap which comprises thermally decomposing the organic insulation into volatile and non-volatile decomposition products in a closed externally heated vessel at a pressure of at least 10 psi, and separating the metallic scrap from the non-volatile decomposition products.

In another aspect, the present invention also is directed to apparatus for removing organic insulation from insulated metallic scrap which comprises a closeable airtight pressure vessel for receiving a charge of insulated metallic scrap; means for externally applying heat to the vessel to thermally decompose the organic insulation into volatile and non-volatile decomposition products; means for periodically removing the volatile decomposition products from the vessel during the thermal decomposition of the organic insulation, the means for removing further maintaining a positive pressure in the vessel; means for recovering the volatile decomposition products, the means for recovering having no substantial effluent to the atmosphere; and means for separating the metallic scrap from the non-volatile decomposition products.

BRIEF DESCRIPTION OF THE DRAWING

The FIGURE depicts a schematic flow diagram of one embodiment of the process of the present invention.

DESCRIPTION OF THE INVENTION

The present invention is directed to a process for treating insulated metallic scrap. Representative examples of insulated metallic scrap articles within the scope of this invention include wire, cable, magnetic coils, transformers, petroleum jelly-filled cable, lead sheathed cable and the like. "Organic insulation" as that term is used herein is intended to refer to all insulation materials which are composed either wholly or in part of organic substances. Inorganic insulation such as asbestos is not within the scope of this invention. Representative of organic insulating materials commonly employed are paper, asphalt, rubber, neoprene, and plastics such as polyvinyl chloride, polyurethane, polyethylene and Teflon. The wire of metallic substrate may be any metal or alloy. Commonly used metals include copper and aluminum.

The invention will now be described by reference to the FIGURE, and the embodiment shown therein. Insulated metallic scrap is placed in a pressure vessel generally shown as 1. The scrap may be loaded directly into the pressure vessel or it may be supported inside the vessel by means of a wire basket insert, shelves or similar supports.

The size of a scrap charge will, of course, depend on the particular design of the vessel. When processing scrap wire or cable the charge preferably comprises individual pieces of wire or cable cut to any suitable length, for example, up to about 18 inches. Longer pieces may, of course, be employed in larger equipment. The scrap charge may also take the form of a mass of loose strands of varying lengths tangled into large coils or bales. Bales suitable for processing according to the present invention may be of widely different bulk densities. As the bulk density of the mass increases, however, it may be desirable to operate the vessel at a higher pressure, as hereinafter described, to promote better heat transfer.

After the mass is placed in the pressure vessel, the vessel is completely sealed against both the inflow and outflow of any gases. Liquid draw off valve 2 and vapor draw off valve 3 are both closed. The sealed pressure vessel is then externally heated to thermally decompose the organic insulation. In the embodiment shown in the FIGURE the means for external heating comprises a gas fired furnace 4. External heating may also take place by other means such as electrical heating of the vessel. While a single vessel is shown in the FIGURE, it will be readily apparent to one skilled in the art that a plurality of such vessels could be externally heated in the same furnace.

The thermal decomposition temperature will, of course, vary with the type of insulation being processed, and can be readily determined by one skilled in the art by simple, small scale testing. For most commonly employed insulation materials, decomposition will take place at a temperature in the range of from about 500° to about 1000° F. By way of example, applicant has found that the preferred range for paper insulation is about 500° to 600° F; for asphalt insulation it is about 600° to 800° F; and for most plastics the preferred range is about 700 to 900° F. Asphaltic-based insulation materials are best decomposed at about 800° F., whereas a plastic material such as polyvinyl chloride may be decomposed most effectively at about 850° F. Decomposition products generated in the pressure vessel also will vary depending on the precise nature of organic insulating material, but in general, they comprise volatile products and non-volatile products.

One of the most important features of the present invention is that the thermal decomposition step is carried out in a sealed vessel and under pressure. As the volatile decomposition products begin to evolve from the scrap mass, the pressure in the sealed vessel rises. The apparatus of the present invention is preferably equipped with a pressure gauge 5 which is employed to monitor the rise in pressure as volatile products are evolved. When the pressure in the vessel reaches a predetermined maximum, a portion of the vapors in the vessel are bled into the closed recovery system by opening valves 3 and 6. The pressure in vessel 1 should not be completely relieved. Only partial venting insures that a positive pressure is maintained in the vessel. The minimum pressure that should be maintained is about 10 psi. Best results are achieved when the minimum pressure is about 20 psi. The predetermined maximum pressure of the system will vary according to the design and construction of the vessel. While pressures under 100 psi and preferably under 50 psi are normally sufficient to achieve the desired results, higher pressures may be employed. Optimum results have been achieved with a great number of insulation materials by keeping the pressure in the vessel between about 20 to 40 psi.

The use of a pressurized system results in thermal decomposition times of from about 5 to about 10 times shorter than the identical system under atmospheric pressure. By way of example, a 1200 pound charge of petroleum jelly filled communication cable was decomposed in about 2 hours at 800° F. and at a pressure between 20 and 40 psi according to the process of the present invention.

The process was repeated using the same charge, equipment and operating conditions, except that the vessel was continuously vented and, therefore, pressure did not build up. Under these circumstances it took about 12 hours to achieve the same degree of decomposition as that of the pressurized system of the present invention. In general, times of from about 45 minutes to about 2 hours are suitable to decompose most commonly employed insulation materials. Longer and shorter times may also be employed with attendant increases or decreases in the degree of decomposition.

The periodically vented volatile decomposition products leaving the vessel through valves 3 and 6 are forwarded to a recovery system containing at least one condenser. In the preferred embodiment shown in the FIGURE this system comprises a primary condenser 7, a secondary condenser 8 and a final condenser 9, all of which are externally cooled, e.g., by water. The condensers may be isolated by valves 10 and 11, and are provided with condensate recovery valves 12, 13, and 14. Since the condensers are preferably operated under positive pressure, they may be equipped with pressure gauges 15, 16, and 17. When more than one condenser is employed each successive condenser is operated at a lower temperature and pressure than the preceding one so as to fractionally recover the insulation decomposition products. The preferred recovery system is closed in that no decomposition by-products are released to the atmosphere. A recovery system employing at least one condenser and a water scrubber to clean atmospheric effluents may also be employed.

When the scrap charge is fully decomposed the heat is turned off and the pressure in the vessel is relieved which allows any remaining volatile products to pass out of the vessel and into the recovery system. Valve 3 can be closed to isolate the vessel from the recovery system.

In the preferred mode of operation, three pressure vessels are employed. While one is undergoing the heating cycle, another is cooling and the third is being unloaded and reloaded with a scrap charge.

Separation of the metallic scrap from non-volatile decomposition products will depend somewhat on the nature of the organic insulation. The organic insulation can decompose into only solid and gaseous products (e.g., most plastics) or it can decompose into solid, liquid, and gaseous products (e.g., asphaltic insulation). In the latter case, the vessel is provided with means for draining off the liquid product which did not volatilize at the decomposition temperature. In the embodiment shown in the FIGURE this drain means is shown at 2. Such drain means is not necessary in the case of an insulation which leaves behind only solid residue.

The final step of the process of the present invention involves the separation of this solid decomposition product from the metallic scrap. In most instances, the solid product is a carbonaceous char which is loosely adhered to the metallic scrap surface. The char is removed from the scrap by mechanical action such as subjecting the coated scrap to a shaker screen, tumbler or the like. Any mechanical device which serves to vibrate or knock the char off the scrap may be employed in the manner known in the art.

The present invention is both efficient and economic in that all the insulation materials are recovered in one form or another. By-products include, inter alia, oils, tars, plastics, acid, fuel gas, and carbon. For example, in the case of an asphaltic-type insulation, the recovered by-products include a heavy asphalt which is drained from the pressure vessel, a number of lighter hydrocarbon oils recovered in the condensers, and a carbonaceous char recovered from the last mechanical separation step. Condensed oils serve to scrub and entrain any light hydrocarbon fuel gases generated in the pyrolysis reaction. These oils can be degassed later to separate these valuable by-products. In the case of chlorinated plastics, HCl vapors generated in the pressure vessel are recovered as an aqueous solution of hydrochloric acid which is formed by condensation of the moisture in the residual air in the system and dissolution of the HCl gas in this condensed moisture. Lead may be recovered from lead-containing insulation by draining off molten lead from the bottom of the pressure vessel during the decomposition process.

In the preferred embodiment of the present invention no substantial gaseous effluents are produced and none are emitted to the atmosphere. As described above, those gaseous products which are not condensed are generally small in quantity and are entrained or dissolved in one of the condensates. The amount of residual system air is so small that it does not contribute to any substantial gaseous effluent. Thus, the overall process is completely nonpolluting. The effluent from the embodiment employing a water scrubber also meets the applicable state and federal air pollution standards.

The metallic scrap recovered from the process of the present invention is completely free of any insulation or its decomposition products. The metal is essentially unchanged physically and chemically and none of the metal is lost or oxidized to an unusable form.

While reference has been made herein to insulated metallic scrap, and more specifically, to insulated wire and cable, it will be readily apparent to one of ordinary skill in the art that the invention is equally applicable to the removal of organic coatings from metal substrates generally.

The following specific example is intended to illustrate more fully the nature of the present invention without acting as a limitation on its scope.

EXAMPLE

The insulated metallic scrap processed according to the present invention in this example is petroleum jelly filled communication cable of the type presently employed for overhead and underground telephone cables. These cables comprise a large number of individual copper wires insulated with polyurethane. The insulated individual wires are grouped together and wrapped with a copper shield. This assembly is coated with an outer sheath of polyurethane insulation and the spaces inside the composite cable are filled with petroleum jelly. Scrap pieces of this cable are loaded into pressure vessel 1 and the vessel is sealed and placed in furnace 4. All valves shown in the FIGURE are closed and then the recovery system is hooked in via quick disconnect coupling 18.

The furnace is fired until the temperature in the vessel reaches 300° F or the pressure reaches 40 psi, whichever is first. Then valve 3 is opened and is left open throughout the process. Valve 6 is opened to relieve the pressure into condenser 7 until gauge 5 reads 20 psi. Valve 6 is then closed until gauge 5 reads 40 psi again at which point the pressure vessel is again vented into condenser 7. This procedure is repeated until the pressure in condenser 7, as shown on gauge 15, reaches 20 psi. Then valve 10 is opened to relieve the pressure in condenser 7 into condenser 8. Valve 6 is then operated to keep the pressure vessel between 20 and 40 psi until condenser 7 again reaches 20 psi. Then valve 10 is closed and valve 11 is opened to relieve the pressure into condenser 9. At this point, the pressure in vessel 1 has started to reduce—i.e., it will not reach 40 psi. Valves 6, 10 and 11 are operated in sequences to keep condenser 7 at a lower pressure than vessel 1; condenser 8 at a lower pressure than condenser 7; and condenser 9 at a lower pressure than condenser 8 until the pressure in vessel 1 reaches 0 psi—i.e., no more vapor being generated. During the course of these venting cycles the temperature in vessel 1 is brought up to 800° F.

At the end of the thermal decomposition step, valves 3 and 6 are closed and vessel 1 is disconnected from the recovery system. After vessel 1 has cooled to a temperature below the flash point of the molten plastic accumulated in the bottom of the vessel, valve 2 is opened to drain this by-product out. The metallic scrap containing a loosely adherent coating of carbonaceous char then is removed from the vessel to a tumbling station where the char is knocked off by mechanical action. Condensed by-products are drained from the condenser through valves 12, 13 and 14.

While certain specific embodiments of the invention have been described with particularity herein, it should be recognized that various modifications thereof will occur to those skilled in the art. Therefore, the scope of the invention is to be limited solely by the scope of the claims appended hereto.

I claim:

1. A method for removing organic insulation from insulated metallic scrap comprising:
   (a) thermally decomposing said organic insulation into volatile and non-volatile decomposition products in a closed, externally heated vessel at a pressure of at least 10 psi above atmospheric pressure, and
   (b) separating said metallic scrap from said non-volatile decomposition products.

2. The method of claim 1 wherein said organic insulation is selected from the group consisting of paper, rubber, neoprene, asphalt, and plastics.

3. The method of claim 1 wherein said volatile decomposition products are periodically removed from said vessel during said decomposing step while maintaining a pressure of at least 10 psi in said vessel.

4. The method of claim 3 further comprising the step of recovering said volatile decomposition products in a closed recovery system.

5. The method of claim 4 wherein said closed recovery system comprises at least one condenser for converting said volatile decomposition products to liquid by-products with substantially no gaseous effluent.

6. The method of claim 1 wherein said non-volatile decomposition products comprise a liquid fraction and a carbonaceous solid fraction adhering to said metallic scrap.

7. The method of claim 6 wherein said liquid and solid fractions are separated by drawing off said liquid fraction.

8. The method of claim 7 wherein said carbonaceous solid is separated from said metallic scrap by mechanical action.

9. The method of claim 8 wherein said mechanical action comprises tumbling.

10. The method of claim 1 wherein said non-volatile decomposition products comprise a carbonaceous solid adhering to said metallic scrap.

11. The method of claim 10 wherein said carbonaceous solid is separated from said metallic scrap by mechanical action.

12. The method of claim 11 wherein said mechanical action comprises tumbling.

13. A method for removing organic insulation from insulated metallic scrap comprising:
   (a) placing the insulated metallic scrap in a closed airtight vessel;
   (b) thermally decomposing said organic insulation under a pressure of at least 10 psi by externally heating said closed vessel;
   (c) periodically removing volatile decomposition products from said vessel during said decomposing step while maintaining a pressure of at least 10 psi above atmospheric pressure in said vessel;
   (d) recovering said volatile decomposition products in a closed recovery system; and
   (e) separating said metallic scrap from non-volatile decomposition products upon completion of said decomposing step.

14. The method of claim 13 wherein said organic insulation is selected from the group consisting of paper, rubber, neoprene, asphalt, and plastics.

15. The method of claim 13 wherein said closed recovery system comprises at least one condenser for converting said volatile decomposition products to liquid by-products with substantially no gaseous effluent.

16. The method of claim 13 wherein said non-volatile decomposition products comprise a liquid fraction and a carbonaceous solid fraction adhering to said metallic scrap.

17. The method of claim 16 wherein said liquid and solid fractions are separated by drawing off said liquid fraction.

18. The method of claim 17 wherein said carbonaceous solid is separated from said metallic scrap by mechanical action.

19. The method of claim 18 wherein said mechanical action comprises tumbling.

20. The method of claim 13 wherein said non-volatile decomposition products comprise a carbonaceous solid adhering to said metallic scrap.

21. The method of claim 20 wherein said carbonaceous solid is separated from said metallic scrap by mechanical action.

22. The method of claim 21 wherein said mechanical action comprises tumbling.

23. Apparatus for removing organic insulation from insulated metallic scrap comprising:
   (a) a closeable airtight pressure vessel for receiving a charge of insulated metallic scrap;
   (b) means for externally heating said vessel to thermally decompose said organic insulation into volatile and non-volatile decomposition products;
   (c) means for periodically removing said volatile decomposition products from said vessel during the thermal decomposition of said organic insulation, said means for removing further maintaining a positive pressure of at least 10 psi above atmospheric pressure in said vessel;
   (d) means for recovering said volatile decomposition products in liquid form, said means for recovering having substantially no gaseous effluent; and
   (e) means for separating said metallic scrap from said non-volatile decomposition products.

24. The apparatus of claim 23 wherein said means for recovering comprises at least one condenser.

25. The apparatus of claim 23 wherein said means for separating comprises a tumbler.

* * * * *